United States Patent [19]

Jelinek

[11] 4,162,079

[45] Jul. 24, 1979

[54] RESILIENT PACKING RING AND ASSEMBLY

[75] Inventor: Jerry G. Jelinek, La Habra, Calif.

[73] Assignee: Parker-Hannifin Corporation, Cleveland, Ohio

[21] Appl. No.: 874,438

[22] Filed: Feb. 2, 1978

[51] Int. Cl.² ............................................. F16J 15/32
[52] U.S. Cl. .................................................. 277/205
[58] Field of Search ..................... 277/205 R, 214, 215

[56] References Cited

U.S. PATENT DOCUMENTS

| | | | |
|---|---|---|---|
| 3,189,359 | 6/1965 | Haberkorn | 277/205 |
| 3,199,831 | 8/1964 | Sully | 277/205 |
| 3,806,137 | 4/1974 | Prasse | 277/205 |
| 3,892,418 | 7/1975 | Felt | 277/205 |

Primary Examiner—Robert I. Smith

Attorney, Agent, or Firm—John N. Wolfram

[57] ABSTRACT

A packing ring of resilient material for down hole sealing of oil well casing against high fluid pressure. The ring is in the general form of a U cup with inner and outer lips. The outer lip is relatively thick and has an outer corner rounded to a large radius that merges with a concave radius on the radially outer surface of the lip to more easily pass over projections and imperfections in surfaces to be sealed by the lip. The inner corner of the outer lip is also rounded to facilitate entry of fluid between the lips for pressing the lips into sealing contact with the surfaces to be sealed. The invention includes the assembly of the packing ring with a sleeve or other part upon which the ring is mounted, the ring being bonded to such part and having a large radius at one end where it is bonded so as to make the bond more secure.

10 Claims, 4 Drawing Figures

RESILIENT PACKING RING AND ASSEMBLY

BACKGROUND OF THE INVENTION

In deep hole oil wells it is necessary to install a packing assembly at a great depth to seal the space between the well casing and the inner tubing to prevent oil from entering the annular space between the two. Very high oil pressure, such as 20,000 PSI, may be experienced at such sealing locations. In addition, because of thermal expansion and contraction of the long strings of pipe, there may be significant relative axial movement between the casing and tubing at the location of the down hole packing assembly. Such axial movement may cause the packing assembly to move over inwardly projecting welding beads and rough surfaces in the casing and the packing assembly may be subject to dirt and other solid particles entrained in the oil being sealed.

Because of the high pressure and other severe conditions to which the down hole packing assemblies are subjected, it has heretofore been the common practice to use either stacked sets of V type (chevron) packing rings or sets of solid cross-section elastomeric packing rings for this service. These types of packing rings have high contact pressure with the walls of the pipes even when not subjected to high fluid pressure and are susceptible to rapid deterioration and possible dislodgement from their mounting grooves due to the severe conditions to which they are exposed.

SUMMARY OF THE INVENTION

The present invention provides a packing ring and assembly that is expecially advantageous for down hole high pressure service in oil wells. It comprises a U cup of resilient elastomeric material in which the outer lip of the U is relatively thick and has an outer corner at its free end that is convexly rounded to a radius nearly the dimension of the thickness of the outer lip so that the packing may readily pass over inwardly extending projections and other imperfections in the pipe. The outer surface of the ring includes a concave surface that merges with the convexly rounded outer corner and extends nearly to the other end of the ring so that the packing may readily pass backwardly over such projections.

The inner corner of the outer lip is also rounded to facilitate entry of fluid into the recess of the U cup when the outer lip is deflected into contact with the inner lip. The ring is bonded to a sleeve or other part to provide an assembly that is highly resistant to dislodgment of the packing ring from the sleeve and the inner corner of the base of the U cup ring is rounded on a large radius to make the bond more secure.

DETAIL DESCRIPTION

Figure 1:
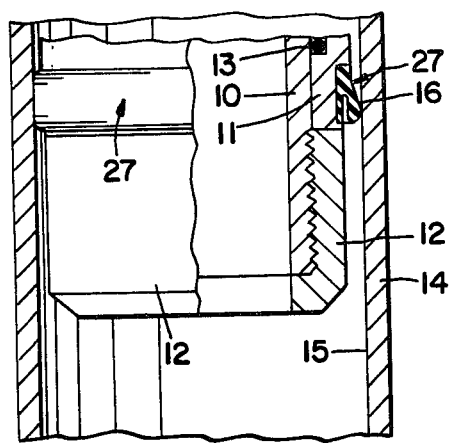
FIG. 1 is a view, partly in cross-section of a packing assembly in an oil well down hole casing.

As shown in FIG. 1, a well tube 10 has a sleeve 11 mounted thereon and retained by a threaded nut 12 which positions sleeve 11 against a radially outwardly projecting shoulder (not shown) on tube 10 above the sleeve so that sleeve 11 is restrained against axial movement in either direction on tube 10. The sleeve is sealed against tube 10 by one or more elastomeric O-rings 13 which act as static seals because sleeve 11 has no appreciable axial motion relative to tube 10. Tube 10 projects into a well casing pipe 14 having an inner cylindrical wall 15.

Figure 2:
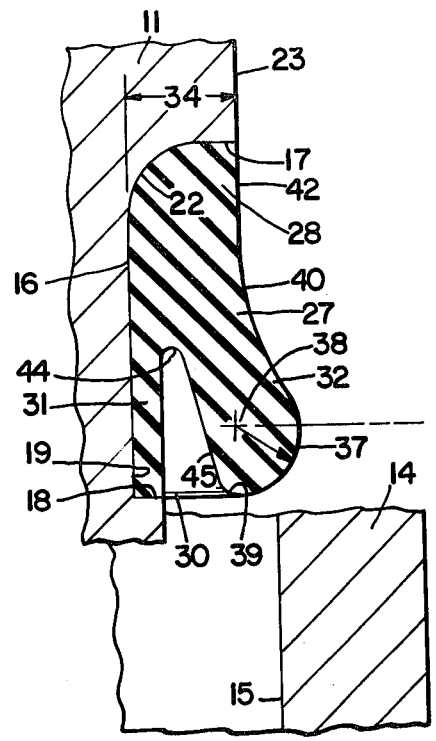
FIG. 2 is an enlarged fragmentary section view through the U cup packing ring mounted in a groove of a sleeve member carrying the U cup and showing these parts before insertion into the well casing.

As shown in FIG. 2, sleeve 11 has a groove 16 with one end wall 17, another end wall 18, and a bottom wall 19 that merges with end wall 17 at a corner 22 having a large radius that is at least one third the maximum radial depth of groove 16. Sleeve 11 also has a cylindrical portion 23 adjacent groove 16 whose diameter is slightly smaller than casing inner wall 15. This difference, for example, may be about 0.006" for a casing whose inner wall 23 is about 3¼" in diameter.

Mounted within groove 16 and bonded to surfaces 17,18,19 and 22 is a U cup 27 that has a base 28 and radially inner and outer lips 31,32 with a recess 30 therebetween whose open end faces the bottom of the well. Inner lip 31 is as thin as practical and the radial width of recess 30 is small so that outer lip 32 may be as thick as is practical for the installation. Preferably, lip 31 is no more than 25% of the thickness of base 28. Thus, when groove 16 has a depth 34 from cylindrical portion 23 of about 0.122", lip 31 may have a thickness of about 0.025" and the maximum thickness of outer lip 32 may be about 0.100". In such case the radius at corner 22 for both groove 16 correspondingly rounded corner of U cup base 28 may be about 0.062". This radius, on both the groove and U cup packing ring, is at least one-third the radial thickness of U cup base 28 and blends tangentially with the adjacent axial and transverse surfaces of the groove and packing ring. This radius, being relatively large, reduces stress concentration in this area when the U cup is subjected to friction and/or fluid pressure forces tending to dislodge the U cup from its groove.

The outer corner 37 of the free end of lip 32 is convexly curved on a radius 38 that is at least 50% but preferably about 75% of the maximum lip thickness and the inner corner 39 of lip 32 is rounded to a radius that is about 25% of such maximum thickness but no less than 20%. Merging into convexly curved outer corner 37 is a concavely curved outer surface 40 that also merges into a short cylindrical surface 42 on base 28. For a U cup with dimensions stated above, the overall axial length of the U cup may be 0.300", the length of cylindrical surface 42 may be 0.050" and the radius of surface 40 may be 0.045". Recess 30 may have an axial depth of about 0.100", its bottom 44 may be curved on a radius of about 0.015" and its outer wall 45 may be at an angle of about 25°. U cup cylindrical surface 42 is preferable of the same diameter as sleeve portion 23.

In the initial undeflected condition of outer lip 32 as shown in FIG. 2, the maximum diameter of the outer lip is in a transverse plane that passes through the center point for radius 38 and is somewhat larger than the diameter of wall 15, as for example about 0.070" larger for a sleeve and U cup with dimensions as above described for use in a casing 14 having an inside wall of about 3.250" diameter.

Figure 3:
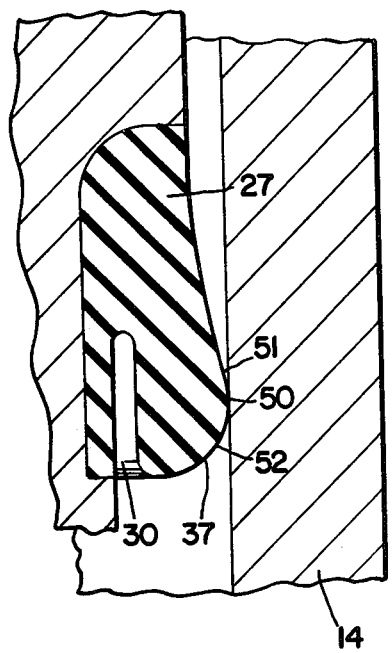
FIG. 3 is like FIG. 2 but showing the packing assembly within the well casing.

When tube 10 with sleeve 11 thereon is inserted into casing 14, outer lip 32 is deflected radially inward to a position as shown in FIG. 3. In this position convex surface 37 has an intermediate portion 50 in contact with casing inner wall 15 and has portions 51,52 on each side of such intermediate portion to provide a lead-in surface for passing over inwardly projecting beads, such as weld bead 54 in FIG. 4. This lead-in feature reduces the possibility of the packing ring from being dislodged from groove 16 as U cup 27 moves up or down in casing 14.

Figure 4:
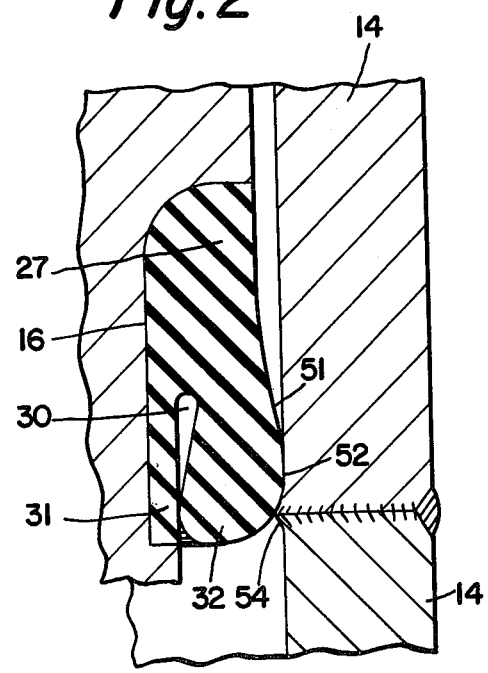
FIG. 4 is like FIG. 3 but showing the U cup passing over an imperfection on the inner surface of the well casing.

When tube 10 with the sleeve 11 and U cup 27 thereon is in place within casing 14 and before application of fluid pressure to the U cup, the outer lip 32 of the U cup will be in initial sealing contact with casing inner wall 15 by virtue of the inward deflection of lip 32 and its tendency to resume its initial undeflected position due to the resilient nature of the material of the U cup. Upon application of high fluid pressure to the open end of the U cup, the fluid will enter recess 30 and act radially outward on outer lip 32 to force it into tighter sealing engagement with casing wall 15. If, while the packing is under fluid pressure, the tube 10 moves up or down in casing 14 so that lip 32 moves over an inwardly projecting weld bead or ridge 54, lip 32 may be deflected radially inward enough to contact inner lip 31, as shown in FIG. 4. In such case, rounded corner 39 permits fluid acting thereon to provide a radially outward force component on lip 32 to facilitate entry of the fluid into recess 30 for maintaining a radially outward force on lip 32.

For down hole installations in oil wells U cup 27 may be of synthetic rubbers such as nitrile (buna N), neoprene (chloroprene), a fluorocarbon rubber such as viton, or of a plastic such as polytetrafluoroethylene and is bonded to sleeve 11 by commercially available adhesives for these materials.

Although the U cup and its assembly with sleeve 11 of the present invention has particular application for down hole high pressure use in oil wells, it may be used for many other applications.

I claim:

1. A packing ring of resilient material, said ring having an unrecessed base portion at one end and having an annular recess extending axially inwardly from the other end thereof to form radially inner and outer lips, said recess having an axial length of less than one half of the overall axial length of said packing ring, said inner and outer lips having substantially equal axial lengths, said inner lip having substantially straight cylindrical axially extending inner and outer walls and having a substantially uniform radial thickness of less than one fourth of the radial thickness of said base, said outer lip having a maximum radial thickness of at least three times the radial thickness of the inner lip, said outer lip having a substantially straight inner wall and an outer corner at its free end that is convexly curved on a radius equal to at least 50% of the maximum thickness of said lip.

2. The packing ring of claim 1 in which said maximum thickness is at least 50% of the radial thickness of the base portion.

3. The packing ring of claim 1 in which the radially outer surface of the ring includes a concavely curved surface that joins said convex curve.

4. The packing ring of claim 1 in which said recess also forms a radially inner lip having a radial thickness of no more than about 25% of the radial thickness of the base portion.

5. A packing ring of resilient material having a base at one axial end thereof and having a recess extending axially from the other end to form radially inner and outer lips, said inner and outer lips having substantially equal axial lengths, said inner lip having substantially straight cylindrical axially extending inner and outer walls and having a substantially uniform radial thickness of less than one fourth of the radial thickness of said base, said outer lip having a substantially straight inner wall and a maximum thickness at least three times the thickness of the inner lip, said base having a transverse end surface and an internal generally cylindrical surface and having a corner between such surfaces that is rounded on a first radius that is equal to at least one-third the radial thickness of the base, said outer lip having inner and outer corners at its free end, said outer corner being rounded on a second radius equal to at least one half of the maximum thickness of the outer lip and the inner corner being rounded on a third radius smaller than the second radius and equal to at least one-fourth such maximum thickness.

6. The packing ring of claim 5 in which the rounding of the outer corner in a radial plane extends axially on both sides of a transverse plane through the center point for the radius in such radial plane.

7. The packing ring of claim 6 in which said ring has a concavely curved radially outer surface that joins said rounded corner.

8. An assembly comprising a first member of rigid material having a cylindrical bore of predetermined diameter, a second member of rigid material mounted in said first member and having a generally cylindrical external surface, said external surface having a larger diameter portion and a smaller diameter portion, a groove at the juncture of said portions, said groove having a deep portion adjacent said larger diameter portion and a shallow portion adjacent said smaller diameter portion, a packing ring of resilient material mounted in said groove, said ring having a base at one axial end thereof and an annular recess extending axially inwardly from the other end thereof and forming radially inner and outer lips, said inner and outer lips having substantially equal axial lengths, said inner lip having substantially straight cylindrical axially extending inner and outer walls and having a substantially uniform radial thickness of less than one-fourth of the radial thickness of said base, said inner lip being disposed in said shallow portion of said groove and the radial thickness of said inner lip being substantially equal to the depth of said shallow portion, said base being disposed in said deep portion of said groove and the radial thickness of said base being substantially equal to the depth of said deep portion, said outer lip having a maximum radial thickness of at least three times the radial thickness of the inner lip, said outer lip having a curved outer surface that initially has a maximum diameter that is greater than the diameter of said bore, said outer lip being bendable and deformable so as to fit within said bore, said outer lip outer surface at the free end of the outer lip having a convex portion on a radius whose length is at least 50% of the maximum thickness of said lip whereby upon such bending and deformation of the lip said convex surface portion will have an intermediate portion in contact with the wall of said bore and will have end portions on either side of said intermediate portion that remain out of contact with said bore.

9. The assembly of claim 8 in which said base has a transverse end surface and an internal generally cylindrical surface and a corner between such surfaces that is rounded on a radius equal to at least one-third the radial thickness of said base, and said deep portion of said groove includes mating surfaces of identical contour to said transverse end surface and to said internal generally cylindrical surface and to said corner.

10. The assembly of claim 8 in which said packing ring has a concave outer surface that merges with said convex portion and is out of contact with said bore wall.

* * * * *